US011466111B2

(12) United States Patent
Ito et al.

(10) Patent No.: US 11,466,111 B2
(45) Date of Patent: Oct. 11, 2022

(54) COATING MATERIAL FOR FORMATION OF MATTE HARD COAT, AND DECORATIVE SHEET USING SAME

(71) Applicant: RIKEN TECHNOS CORPORATION, Tokyo (JP)

(72) Inventors: Shigekazu Ito, Tokyo (JP); Koji Inagaki, Tokyo (JP)

(73) Assignee: RIKEN TECHNOS CORPORATION

( * ) Notice: Subject to any disclaimer, the term of this patent is extended or adjusted under 35 U.S.C. 154(b) by 150 days.

(21) Appl. No.: 16/464,068

(22) PCT Filed: Nov. 14, 2017

(86) PCT No.: PCT/JP2017/040922
§ 371 (c)(1),
(2) Date: May 24, 2019

(87) PCT Pub. No.: WO2018/096976
PCT Pub. Date: May 31, 2018

(65) Prior Publication Data
US 2019/0382613 A1 Dec. 19, 2019

(30) Foreign Application Priority Data
Nov. 25, 2016 (JP) .............................. JP2016-228540

(51) Int. Cl.
*C08F 220/18* (2006.01)
*C09D 133/06* (2006.01)
*C09D 7/40* (2018.01)
*C09D 7/62* (2018.01)
*C08K 3/013* (2018.01)
*C08F 212/08* (2006.01)
*C08F 220/14* (2006.01)
*C08G 18/73* (2006.01)
*C09D 125/06* (2006.01)
*C09D 133/12* (2006.01)
*C09D 175/04* (2006.01)
*C08K 3/22* (2006.01)

(52) U.S. Cl.
CPC ...... *C08F 220/1804* (2020.02); *C08F 212/08* (2013.01); *C08F 220/14* (2013.01); *C08G 18/73* (2013.01); *C08K 3/013* (2018.01); *C09D 7/62* (2018.01); *C09D 7/67* (2018.01); *C09D 125/06* (2013.01); *C09D 133/066* (2013.01); *C09D 133/12* (2013.01); *C09D 175/04* (2013.01); *C08F 220/1808* (2020.02); *C08K 2003/2227* (2013.01); *C08K 2201/005* (2013.01)

(58) Field of Classification Search
CPC .................................................. C09D 133/066
USPC .......................................................... 523/220
See application file for complete search history.

(56) References Cited

U.S. PATENT DOCUMENTS

| 4,380,604 | A | * | 4/1983 | Neuhaus | ................. | G03F 7/038 |
|---|---|---|---|---|---|---|
| | | | | | | 524/871 |
| 5,159,011 | A | | 10/1992 | Rau et al. | | |
| 8,664,327 | B2 | * | 3/2014 | Chiga | .................. | C09D 133/08 |
| | | | | | | 524/523 |
| 2001/0038910 | A1 | * | 11/2001 | MacQueen | .............. | C08J 3/244 |
| | | | | | | 428/327 |
| 2005/0249939 | A1 | * | 11/2005 | Barkac | ..................... | C09D 7/61 |
| | | | | | | 428/323 |
| 2015/0148443 | A1 | * | 5/2015 | Kang | ...................... | C08J 7/042 |
| | | | | | | 522/64 |
| 2019/0264060 | A1 | * | 8/2019 | Ito | .......................... | B32B 38/18 |

FOREIGN PATENT DOCUMENTS

| CN | 1226278 | A | 8/1999 |
|---|---|---|---|
| CN | 101166798 | A | 4/2008 |
| CN | 104520387 | A | 4/2015 |
| EP | 3067371 | A1 | 9/2016 |
| EP | 3553846 | A1 | 9/2019 |
| JP | S61281133 | A | 12/1986 |
| JP | 2007025155 | A | 2/2007 |
| JP | 2012036314 | A | 2/2012 |

(Continued)

OTHER PUBLICATIONS

PCT/JP2017/040922 International Search Report dated Dec. 12, 2017; 2 pgs.

(Continued)

*Primary Examiner* — Vickey Nerangis
(74) *Attorney, Agent, or Firm* — Bracewell LLP; Brad Y. Chin

(57) ABSTRACT

Embodiments provide a coating material containing: (A) 100 parts by mass of an acrylic curable resin; (B) 5-200 parts by mass of aluminum oxide particles having an average particle size of 1-100 μm; (C) 0.1-20 parts by mass of aluminum oxide fine particles having an average particle size of 1-100 nm; and (D) 1-100 parts by mass of a compound having two or more isocyanate groups per molecule. In one embodiment, the acrylic curable resin (A) includes: (a1) a structural unit derived from a hydroxy group-containing (meth)acrylic acid ester; (a2) a structural unit derived from a vinyl aromatic compound; and (a3) a structural unit derived from a (meth)acrylic acid alkyl ester. In one embodiment, the acrylic curable resin (A) may contain, in addition to the structural units (a1) and (a2): (a3-1) a structural unit derived from methyl methacrylate; and (a3-2) a structural unit derived from an aliphatic (including alicyclic) alkyl ester having 4 or more carbon atoms of a (meth)acrylic acid.

10 Claims, 4 Drawing Sheets

(56) References Cited

FOREIGN PATENT DOCUMENTS

| | | |
|---|---|---|
| JP | 2012091487 A | 5/2012 |
| JP | 2013031995 A | 2/2013 |
| JP | 2013151133 A | 8/2013 |
| JP | 2014169434 A | 9/2014 |
| WO | 2014122866 A1 | 8/2014 |

OTHER PUBLICATIONS

EP17874541.0 Supplementary Search Report dated Jun. 16, 2020, 7 pgs.
CN201780072748.4 First Office Action dated Nov. 19, 2020, 18 pgs.

* cited by examiner

COATING MATERIAL FOR FORMATION OF MATTE HARD COAT, AND DECORATIVE SHEET USING SAME

CROSS REFERENCE TO RELATED APPLICATIONS

This application claims the benefit of and priority to PCT/JP2017/040922, filed on Nov. 14, 2017, entitled (translation), "COATING MATERIAL FOR FORMATION OF MATTE HARD COAT, AND DECORATIVE SHEET USING THE SAME," which claims the benefit of and priority to Japanese Patent Application No. 2016-228540, filed on November 2016, which are hereby incorporated by reference in their entirety into this application.

BACKGROUND

Embodiments relate to a coating material. More specifically, embodiments relate to a coating material capable of forming a hard coat that imparts a matte design (hereinafter also referred to as "matte hard coat" in some cases) and a decorative sheet obtained using the same.

DESCRIPTION OF THE RELATED ART

Conventionally, a decorative sheet has been used with the sheet being laminated for decoration on the surface of household electrical appliances such as refrigerator, washing machine, air conditioner, mobile phone and personal computer; furniture such as display cabinet, storing chest, dish cupboard and desk; or substrates formed from a wood-based material such as wood, plywood, laminated wood, particle board or hard board as building materials for floor, wall and bathroom, etc.; substrates formed from a resin-based material such as polystyrene, acrylonitrile-butadiene-styrene copolymer resin (ABS resin), polycarbonate or polyester; or substrates formed from a metallic material such as iron or aluminum. In recent years, as a point-of-difference for products, the designability is being increasingly important. Accordingly, it has been proposed to form a hard coat on the surface layer of a decorative sheet using a coating material containing a matting agent, thereby imparting a matte design to the decorative sheet (for example, see Patent Literatures 1 and 2). However, these techniques are disadvantageous in that the scratch resistance is insufficient; and the matting agent settles over time on the bottom of a coating material pan during coating, so that the properties such as matte property of the obtained decorative sheet are not stable. In addition, it is difficult to use these techniques for decoration of an adherend having a complicated curved surface.

CITATION LIST

Patent Literature

PATENT LITERATURE 1: JP-A-2012-091487
PATENT LITERATURE 2: JP-A-2013-031995

SUMMARY

An object of the various embodiments is to provide a coating material capable of forming a matte hard coat and a decorative sheet that has a matte design obtained using the same. A further object of the various embodiments is to provide a coating material capable of forming a hard coat that imparts a stable matte design and is excellent in scratch resistance, preferably excellent in crack resistance and bending resistance, and a decorative sheet that has a matte design obtained using the same, preferably can be suitably used for decoration of an adherend having a complicated curved surface.

It is understood that "crack resistance" usually indicates durability against crack when flexed, and thus means substantially the same property as "flex resistance".

As a result of earnest study, the present inventors have found that the above objects can be achieved by a specific coating material according to various embodiments.

According to at least one embodiment, there is provided a coating material including: (A) 100 parts by mass of an acrylic curable resin; (B) 5-250 parts by mass of aluminum oxide particles having an average particle diameter of 1-100 μm; (C) 0.1-20 parts by mass of aluminum oxide fine particles having an average particle diameter of 1-100 nm; and (D) 1-100 parts by mass of a compound having two or more isocyanate groups per molecule, wherein the acrylic curable resin (A) comprises: (a1) a structural unit derived from a hydroxyl group-containing (meth)acrylic acid ester; (a2) a structural unit derived from a vinyl aromatic compound; and (a3) a structural unit derived from a (meth)acrylic acid alkyl ester.

According to at least one embodiment, the acrylic curable resin (A) comprises the structural unit derived from a hydroxyl group-containing (meth)acrylic acid ester (a1) in an amount of 5 to 40 mol %, with respect to 100 mol % of the total sum of structural units derived from all constituent monomers.

According to at least one embodiment, the acrylic curable resin (A) includes the structural unit derived from a vinyl aromatic compound (a2) in an amount of 10 to 50 mol %, with respect to 100 mol % of the total sum of structural units derived from all constituent monomers.

According to at least one embodiment, the acrylic curable resin (A) comprises the structural unit derived from a (meth)acrylic acid alkyl ester (a3) in an amount of 20 to 85 mol %, with respect to 100 mol % of the total sum of structural units derived from all constituent monomers.

According to at least one embodiment, the acrylic curable resin (A) includes: (a1) a structural unit derived from a hydroxyl group-containing (meth)acrylic acid ester; (a2) a structural unit derived from a vinyl aromatic compound; (a3-1) a structural unit derived from methyl methacrylate; and (a3-2) a structural unit derived from an aliphatic alkyl ester having 4 or more carbon atoms of a (meth)acrylic acid.

According to at least one embodiment, the acrylic curable resin (A) comprises the structural unit derived from methyl methacrylate (a3-1) in an amount of 10 to 50 mol %, with respect to 100 mol % of the total sum of structural units derived from all constituent monomers.

According to at least one embodiment, the acrylic curable resin (A) includes the structural unit derived from an aliphatic alkyl ester having 4 or more carbon atoms of a (meth)acrylic acid (a3-2) in an amount of 5 to 40 mol %, with respect to 100 mol % of the total sum of structural units derived from all constituent monomers.

According to at least one embodiment, there is provided an article including a hard coat formed from the coating material according to various embodiments.

According to at least one embodiment, there is provided a decorative sheet including a hard coat formed from the coating material according to various embodiments.

According to at least one embodiment, there is provided an article including the decorative sheet according to various embodiments.

The hard coat formed from the coating material according to various embodiments can impart a matte design. In addition, the hard coat is excellent in scratch resistance. According to at least one embodiment, one of the coating materials can be used for stable coating, so that properties such as matte property of the formed hard coat are stable. In addition, the hard coat formed from the coating material according to at least one embodiment is excellent in scratch resistance, crack resistance and bending resistance. Accordingly, the coating material according to at least one embodiment can be suitably used as a coating material capable of forming a hard coat for imparting a matte design to a decorative sheet. Furthermore, the decorative sheet provided with a matte design using a coating material according to at least one embodiment can be suitably used for decoration of an adherend having a complicated curved surface.

DETAILED DESCRIPTION

Figure 1:
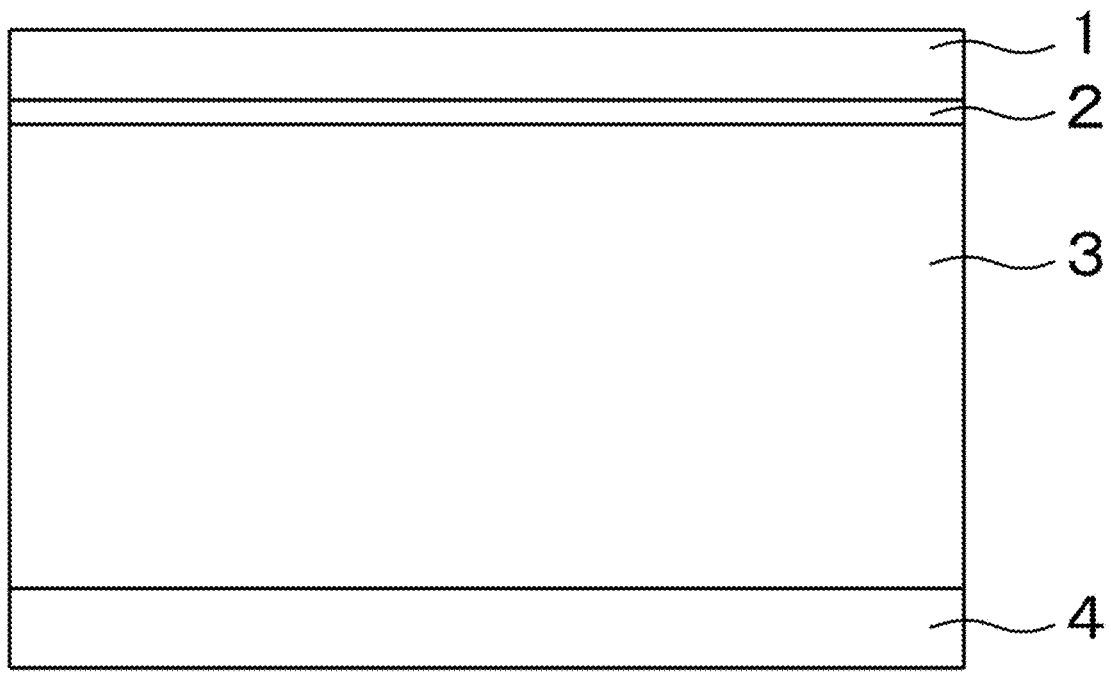
FIG. 1 is a conceptual cross-sectional diagram showing an example of a decorative sheet according to at least one embodiment.

Herein, the term "film" is used interchangeably or replaceably with "sheet". The term "resin" is used as a term including a resin mixture containing two or more resins or a resin composition containing a component(s) other than a resin. Also, in this specification, sequential lamination of one layer and another layer includes direct lamination of these layers, and lamination of these layers between which at least one other layer such as an anchor coat is placed. The term "or more" for numerical range is used to mean a certain numerical value or more than the certain numerical value. For example, 20% or more means 20% or more than 20%. The term "or less" for numerical range is used to mean a certain numerical value or less than the certain numerical value. For example, 20% or less means 20% or less than 20%. Furthermore, the symbol "-" for numerical range is used to mean a certain numerical value, more than the certain numerical value and less than another certain numerical value, or the other certain numerical value. Here, the other certain numerical value is a numerical value larger than the certain numerical value. For example, 10-90% means 10%, more than 10% and less than 90%, or 90%.

Except for Examples, or unless otherwise specified, it is to be understood that all numerical values used in the specification and claims shall be modified by the term "about". Without intending to limit application of the doctrine of equivalents to the claims, each numerical value should be interpreted in light of significant figures and by applying an ordinary rounding technique.

1. Coating Material

A coating material according to at least one embodiment includes: (A) an acrylic curable resin; (B) aluminum oxide particles having an average particle diameter of 1-100 μm; (C) aluminum oxide fine particles having an average particle diameter of 1-100 nm; and (D) a compound having two or more isocyanate groups per molecule.

(A) Acrylic Curable Resin

The acrylic curable resin as component (A) is an acrylic resin, which can be polymerized and cured using a curing agent such as a compound having an isocyanate group; heat; and an active energy ray such as ultraviolet ray or ionizing radiation. Component (A) serves to form a hard coat via polymerization and curing.

The acrylic curable resin as component (A) contains (a1) a structural unit derived from a hydroxyl group-containing (meth)acrylic acid ester. In the present specification, the (meth)acrylic acid means methacrylic acid or acrylic acid.

Without wishing to be bound by theory, it is considered the reason why a decorative sheet having a hard coat formed using the coating material according to at least one embodiment can also be suitably used for decoration of an adherend having a complicated curved surface is that the crack resistance and bending resistance of the formed hard coat can be improved by a chemical reaction of the hydroxyl group derived from the structural unit (a1) with the compound (D) having two or more isocyanate groups per molecule to form urethane bonds.

The acrylic curable resin as component (A) preferably contains: (a1) a structural unit derived from a hydroxyl group-containing (meth)acrylic acid ester; and (a2) a structural unit derived from a vinyl aromatic compound. When the structural unit (a2) is contained, the scratch resistance of the formed hard coat can be improved. In addition, adhesion between the hard coat and the film substrate can be improved. Without wishing to be bound by theory, it is considered that the structural unit (a2) has a stiff structure (rigid structure) of the aromatic ring and thus enhances the hardness of the hard coat and improves the scratch resistance thereof. In addition, it is considered that the aromatic ring has a planar spatial conformation and thus improves adhesion between the hard coat and the film substrate.

The acrylic curable resin as component (A) more preferably contains: (a1) a structural unit derived from a hydroxyl group-containing (meth)acrylic acid ester; (a2) a structural unit derived from a vinyl aromatic compound; and (a3) a structural unit derived from a (meth)acrylic acid alkyl ester (containing no hydroxyl group). The acrylic curable resin as component (A) still more preferably contains: (a1) a structural unit derived from a hydroxyl group-containing (meth) acrylic acid ester; (a2) a structural unit derived from a vinyl aromatic compound; (a3-1) a structural unit derived from methyl methacrylate; and/or (a3-2) a structural unit derived from an aliphatic alkyl ester (containing no hydroxyl group) having 4 or more carbon atoms of a (meth)acrylic acid. "Aliphatic" as used herein includes alicyclic. These structural units (a3-1) and (a3-2) belong to the subordinate concept of the structural unit (a3). When the structural unit (a3-1) is contained, the scratch resistance of the formed hard coat can be improved. When the structural unit (a3-2) is contained, the crack resistance and bending resistance of the formed hard coat can be improved.

The hydroxyl group-containing (meth)acrylic acid ester is a (meth)acrylic acid ester having one or more hydroxyl groups per molecule. Examples of the hydroxyl group-containing (meth)acrylic acid ester may include, but are not particularly limited to, 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate and 4-hydroxybutyl (meth)acrylate. As the hydroxyl group-containing (meth)acrylic acid ester, one kind or a mixture of two or more kinds of them may be used.

The aromatic vinyl compound is a polymerizable monomer having a polymerizable carbon-carbon double bond and aromatic ring. Examples of the aromatic vinyl compound may include, but are not particularly limited to, styrene, t-butylstyrene, α-methylstyrene, p-methylstyrene, divinylbenzene, 1,1-diphenylstyrene, N,N-diethyl-p-aminoethylstyrene, vinyltoluene and p-tert-butylstyrene. Among them, styrene is preferable. As the aromatic vinyl compound, one kind or a mixture of two or more kinds of them may be used.

The (meth)acrylic acid alkyl ester (containing no hydroxyl group) is an aliphatic alkyl ester of (meth)acrylic acid, which may have an ether group. "Aliphatic" as used herein includes alicyclic. Examples of the (meth)acrylic acid alkyl ester may include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate and stearyl (meth)acrylate. Examples of the compound having an ether group may include methoxymethyl (meth)acrylate, ethoxymethyl (meth)acrylate, 2-ethoxyethyl (meth)acrylate, 2-butoxyethyl (meth)acrylate, 2-methoxyethyl (meth)acrylate, 2-propoxyethyl (meth)acrylate, 3-methoxypropyl (meth)acrylate and 4-methoxybutyl (meth)acrylate. As the (meth)acrylic acid alkyl ester, from a viewpoint of balance between scratch resistance of the hard coat to be formed, and crack resistance and bending resistance thereof, it is preferable to use the (a3-1) methyl methacrylate and the (a3-2) aliphatic alkyl ester (containing no hydroxyl group) having 4 or more carbon atoms of a (meth)acrylic acid in combination. As the (meth)acrylic acid alkyl ester, one kind or a mixture of two or more kinds of them may be used.

From a viewpoint of crack resistance and bending resistance of the hard coat to be formed, the content of the structural unit (a1) in the acrylic curable resin as component (A) may be usually 5 mol % or more, preferably 8 mol % or more, more preferably 10 mol % or more, with respect to 100 mol % of the total sum of the structural units derived from all the constituent monomers. On the other hand, from a viewpoint of blocking resistance, the content of the structural unit (a1) in component (A) may be usually 40 mol % or less, preferably 35 mol % or less, more preferably 30 mol % or less.

In one aspect, the content of the structural unit (a1) in component (A) may be usually 5 mol % or more and 40 mol % or less, preferably 5 mol % or more and 35 mol % or less, 5 mol % or more and 30 mol % or less, 8 mol % or more and 40 mol % or less, 8 mol % or more and 35 mol % or less, 8 mol % or more and 30 mol % or less, 10 mol % or more and 40 mol % or less, 10 mol % or more and 35 mol % or less, or 10 mol % or more and 30 mol % or less.

From a viewpoint of increasing the hardness of the hard coat and improving the scratch resistance thereof, the content of the structural unit (a2) in the acrylic curable resin as component (A) may be usually 10 mol % or more, preferably 15 mol % or more, more preferably 20 mol % or more, with respect to 100 mol % of the total sum of the structural units derived from all the constituent monomers. On the other hand, from a viewpoint of crack resistance and bending resistance of the hard coat to be formed, the content of the structural unit (a2) in component (A) may be usually 50 mol % or less, preferably 40 mol % or less, more preferably 35 mol % or less.

In one aspect, the content of the structural unit (a2) in component (A) may be usually 10 mol % or more and 50 mol % or less, preferably 10 mol % or more and 40 mol % or less, 10 mol % or more and 35 mol % or less, 15 mol % or more and 50 mol % or less, 15 mol % or more and 40 mol % or less, 15 mol % or more and 35 mol % or less, 20 mol % or more and 50 mol % or less, 20 mol % or more and 40 mol % or less, or 20 mol % or more and 35 mol % or less.

From a viewpoint of making it possible to easily dissolve component (A) in a solvent, the content of the structural unit (a3) in the acrylic curable resin as component (A) may be usually 20 mol % or more, preferably 30 mol % or more, more preferably 40 mol % or more, with respect to 100 mol % of the total sum of the structural units derived from all the constituent monomers. On the other hand, from a viewpoint of solvent resistance of the hard coat to be formed, the content of the structural unit (a3) in component (A) may be usually 85 mol % or less, preferably 75 mol % or less, more preferably 65 mol % or less.

In one aspect, the content of the structural unit (a3) in component (A) may be usually 20 mol % or more and 85 mol % or less, preferably 20 mol % or more and 75 mol % or less, 20 mol % or more and 65 mol % or less, 30 mol % or more and 85 mol % or less, 30 mol % or more and 75 mol % or less, 30 mol % or more and 65 mol % or less, 40 mol % or more and 85 mol % or less, 40 mol % or more and 75 mol % or less, or 40 mol % or more and 65 mol % or less.

From a viewpoint of scratch resistance of the hard coat to be formed, the content of the structural unit (a3-1) in the acrylic curable resin as component (A) may be usually 10 mol % or more, preferably 15 mol % or more, more preferably 20 mol % or more, with respect to 100 mol % of the total sum of the structural units derived from all the constituent monomers. On the other hand, from a viewpoint of crack resistance and bending resistance of the hard coat to be formed, the content of the structural unit (a3-1) in component (A) may be usually 50 mol % or less, preferably 45 mol % or less, more preferably 40 mol % or less.

In one aspect, the content of the structural unit (a3-1) in component (A) may be usually 10 mol % or more and 50 mol % or less, preferably 10 mol % or more and 45 mol % or less, 10 mol % or more and 40 mol % or less, 15 mol % or more and 50 mol % or less, 15 mol % or more and 45 mol % or less, 15 mol % or more and 40 mol % or less, 20 mol % or more and 50 mol % or less, 20 mol % or more and 45 mol % or less, or 20 mol % or more and 40 mol % or less.

From a viewpoint of crack resistance and bending resistance of the hard coat to be formed, the content of the structural unit (a3-2) in the acrylic curable resin as component (A) may be usually 5 mol % or more, preferably 10 mol % or more, more preferably 15 mol % or more, with respect to 100 mol % of the total sum of the structural units derived from all the constituent monomers. On the other hand, from a viewpoint of scratch resistance of the hard coat to be formed, the content of the structural unit (a3-2) in component (A) may be usually 40 mol % or less, preferably 35 mol % or less, more preferably 30 mol % or less.

In one aspect, the content of the structural unit (a3-2) in component (A) may be usually 5 mol % or more and 40 mol % or less, preferably 5 mol % or more and 35 mol % or less, 5 mol % or more and 30 mol % or less, 10 mol % or more and 40 mol % or less, 10 mol % or more and 35 mol % or less, 10 mol % or more and 30 mol % or less, 15 mol % or more and 40 mol % or less, 15 mol % or more and 35 mol % or less, or 15 mol % or more and 30 mol % or less.

In addition to the structural units (a1), (a2) and (a3) (or subordinate concepts (a3-1) and (a3-2)), the acrylic curable resin as component (A) may contain a structural unit derived from another polymerizable monomer that is copolymerizable with at least any one of hydroxyl group-containing (meth)acrylic acid ester, vinyl aromatic compound and (meth)acrylic acid alkyl ester. The other polymerizable monomer is usually a compound having a carbon-carbon double bond, typically a compound having an ethylenic double bond.

Figure 2:
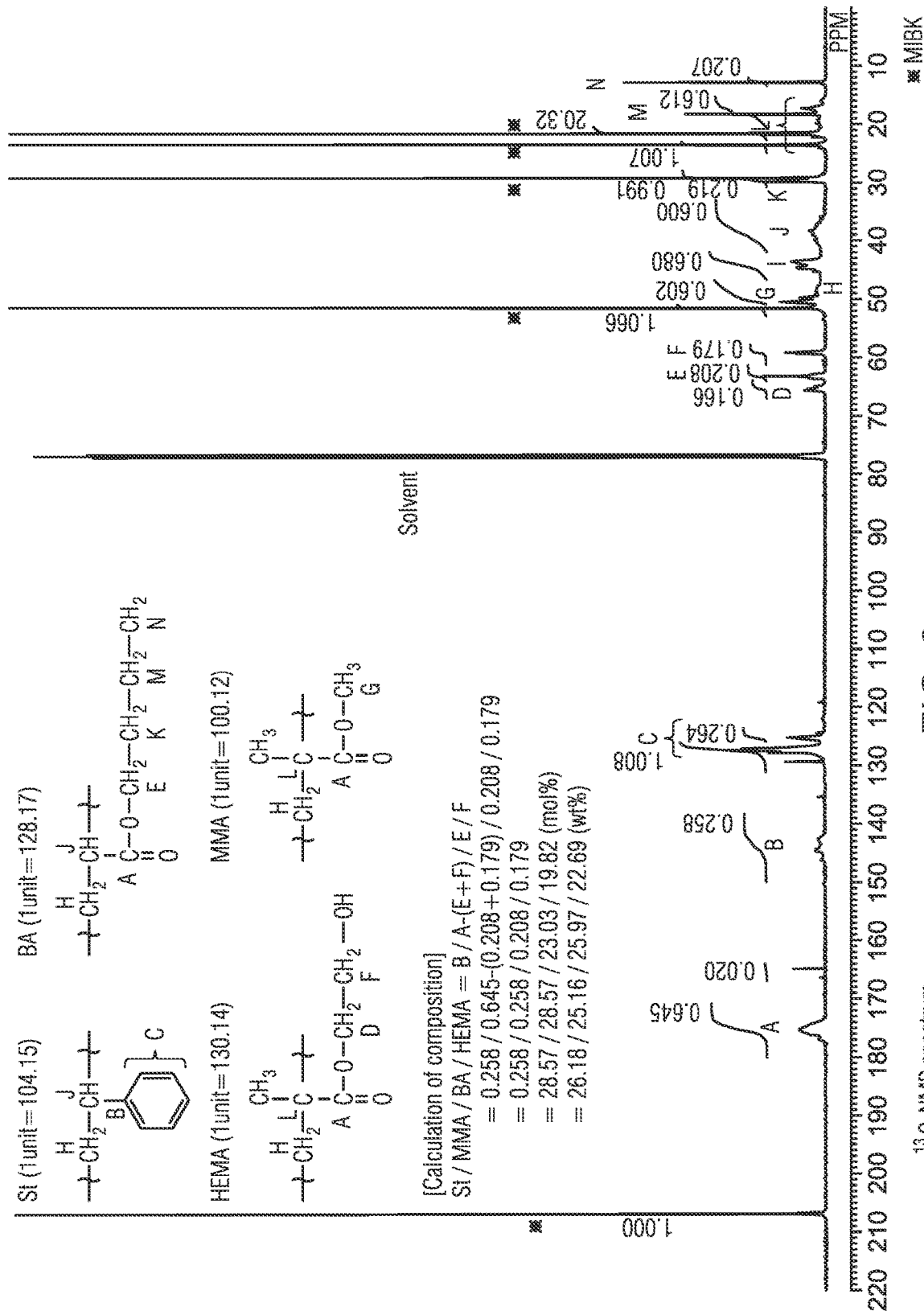
FIG. 2 is a $^{13}$C-NMR spectrum of a resin of component (A-1) used in Examples.

The content of each of structural units such as the structural units (a1), (a2) and (a3) in the acrylic curable resin as component (A) can be determined using $^{13}$C-NMR. For example, the $^{13}$C-NMR spectrum can be measured under the following conditions using 60 mg of a sample dissolved in 0.6 mL of chloroform-d1 solvent and using a 125 MHz nuclear magnetic resonance apparatus. FIG. 2 shows a measurement example. In FIG. 2, St, BA, HEMA and MMA indicating structural units mean styrene, butyl acrylate, 2-hydroxyethyl methacrylate and methyl methacrylate, respectively.

Chemical shift reference: chloroform-d1 was set at 77.0 ppm.

Measurement mode: single pulse-inverse gated decoupling

Pulse width: 30° (3.70 μs)
Number of points: 32 K
Measurement range: 250 ppm (−25-225 ppm)
Repeat time: 30.0 s
Number of integrations: 7,500 times
Measurement temperature: 25° C.
Window function: exponential (BF: 2.00 Hz)

Peak attribution is determined with reference to "Polymer Analysis Handbook (first printing of first edition, issued on Sep. 20, 2008, edited by Polymer Analysis Research Conference in Japan Society for Analytical Chemistry, published by Asakura Publishing Co., Ltd.)" or "NMR database of Materials Information Technology Station in National Institute for Materials Science (http://polymetnims.go.jp/NMR/)". From the peak area ratio, the percentage of each structural unit in component (A) can be calculated. In addition, measurement of $^{13}$C-NMR can also be performed in an analytical institution such as Mitsui Chemical Analysis & Consulting Service, Inc.

A method for producing the acrylic curable resin as component (A) is not particularly limited, but a known method may be used.

From a viewpoint of crack resistance and bending resistance of the hard coat to be formed, the mass average molecular weight of the acrylic curable resin as component (A) may be usually 5,000 or more, preferably 10,000 or more. On the other hand, from a viewpoint of handleability of the coating material, this mass average molecular weight may be usually 100,000 or less, preferably 50,000 or less.

In an exemplary embodiment, the mass average molecular weight of the acrylic curable resin as component (A) is calculated as a molecular weight in terms of polystyrene from a differential molecular weight distribution curve (hereinafter sometimes abbreviated as GPC curve) measured by gel permeation chromatography (hereinafter sometimes abbreviated as GPC). GPC measurement can be achieved using a GPC equipment from Tosoh Corporation and a total of 4 columns of 2 GPC columns "KF-806L" (trade name), one "KF-802" (trade name) and one "KF-801" (trade name) from Shodex such that KF-806L, KF-806L, KF-802 and KF-801 are connected in this order from the upstream side, and using special grade tetrahydrofuran (containing no stabilizer) from Wako Pure Chemical Industries, Ltd. as a mobile phase under conditions of a flow rate of 1.0 mL/min, a column temperature of 40° C., a sample concentration of 1.0 mg/mL and a sample injection volume of 100 μL. During this time period, the elution amount for each retention volume is determined from the amount detected by an RI detector, assuming that the refractive index is independent of molecular weight. The mass average molecular weight of component (A) used in Examples was measured in accordance with this method. The number average molecular weight of component (A) used in Examples was also measured in accordance with the same method.

Regarding the theory of GPC and actual measurement, you can make reference to guide books such as "Size Exclusion Chromatography/High-Performance Liquid Chromatography of Polymer", Author: Sadao Mori, first printing of first edition, issued on Dec. 10, 1991, published by Kyoritsu Shuppan Co., Ltd.

The acrylic curable resin as component (A) may be a resin mixture containing two or more acrylic curable resins. In the case of a resin mixture, the mixture may be controlled to contain the structural units (a1), (a2) and (a3) (or subordinate concepts (a3-1) and (a3-2)), and the like, preferably the contents of them being within the above-mentioned ranges. The same thing applies to other properties of component (A).

(B) Aluminum Oxide Particles Having an Average Particle Diameter of 1-100 μm

The aluminum oxide particles having an average particle diameter of 1-100 μm as component (B) serve to improve the scratch resistance and surface hardness of the hard coat. In addition, component (B) serves to provide a matte design to the hard coat formed from the coating material according to at least one embodiment, or to make the hard coat smoother to touch.

It is preferable to use the aluminum oxide particles having an average particle diameter of 1-100 μm as component (B) whose surface is treated with a surface treatment agent or the like, for example, silane based coupling agents such as vinylsilane and aminosilane; titanate based coupling agents; aluminate based coupling agents; organic compounds having an ethylenic unsaturated bond group such as (meth)acryloyl group, vinyl group or allyl group, or a reactive functional group such as epoxy group; and fatty acids and fatty acid metal salts. It is thereby possible to enhance dispersibility of component (B) in the coating material and to enhance the surface hardness of the hard coat to be obtained.

From a viewpoint of preventing the aluminum oxide particles having an average particle diameter of 1-100 μm as component (B) from settling over time on the bottom of a coating material pan during coating, the average particle diameter of component (B) may be usually 100 μm or less, preferably 50 μm or less, more preferably 20 μm or less. On the other hand, from a viewpoint of scratch resistance of the hard coat to be formed, the average particle diameter may be usually 1 μm or more, preferably 3 μm or more, more preferably 5 μm or more.

In one aspect, the average particle diameter of the aluminum oxide particles having an average particle diameter of 1-100 μm as component (B) may be usually 100 μm or less and 1 μm or more, preferably 100 μm or less and 3 μm or more, 100 μm or less and 5 μm or more, 50 μm or less and 1 μm or more, 50 μm or less and 3 μm or more, 50 μm or less and 5 μm or more, 20 μm or less and 1 μm or more, 20 μm or less and 3 μm or more, or 20 μm or less and 5 μm or more.

In the present specification, the average particle diameter of the particles of component (B) or the fine particles of component (C) is a particle diameter at an accumulation from the smaller of the particles of 50 mass % in the particle diameter distribution curve measured using a laser diffraction/scattering type particle size analyzer "MT3200II" (trade name) from Nikkiso Co., Ltd.

Any laser diffraction/scattering type particle diameter analyzer available from another supply source may be used for measuring the average particle diameter of the particles or fine particles. In other words, those skilled in the art can measure the average particle diameter of the particles or fine particles based on the above definition and referring to the technical common sense.

From a viewpoint of crack resistance and bending resistance of the hard coat, the amount of the aluminum oxide particles having an average particle diameter of 1-100 μm as component (B) may be usually 250 parts by mass or less, preferably 200 parts by mass or less, more preferably 150 parts by mass or less, still more preferably 120 parts by mass or less, most preferably 100 parts by mass or less, with respect to 100 parts by mass of component (A). On the other hand, the lower limit of the amount of component (B) may be usually 5 parts by mass or more, preferably 20 parts by mass or more, more preferably 40 parts by mass or more, still more preferably 50 parts by mass or more, most preferably 60 parts by mass or more, although it depends on the desired degree of matting.

In one aspect, the amount of the aluminum oxide particles having an average particle diameter of 1-100 μm as component (B) may be usually 5 parts by mass or more and 250 parts by mass or less, preferably 5 parts by mass or more and 200 parts by mass or less, 5 parts by mass or more and 150 parts by mass or less, 5 parts by mass or more and 120 parts by mass or less, 5 parts by mass or more and 100 parts by mass or less, 20 parts by mass or more and 250 parts by mass or less, 20 parts by mass or more and 200 parts by mass or less, 20 parts by mass or more and 150 parts by mass or less, 20 parts by mass or more and 120 parts by mass or less, 20 parts by mass or more and 100 parts by mass or less, 40 parts by mass or more and 250 parts by mass or less, 40 parts by mass or more and 200 parts by mass or less, 40 parts by mass or more and 150 parts by mass or less, 40 parts by mass or more and 120 parts by mass or less, 40 parts by mass or more and 100 parts by mass or less, 50 parts by mass or more and 250 parts by mass or less, 50 parts by mass or more and 200 parts by mass or less, 50 parts by mass or more and 150 parts by mass or less, 50 parts by mass or more and 120 parts by mass or less, 50 parts by mass or more and 100 parts by mass or less, 60 parts by mass or more and 250 parts by mass or less, 60 parts by mass or more and 200 parts by mass or less, 60 parts by mass or more and 150 parts by mass or less, 60 parts by mass or more and 120 parts by mass or less, or 60 parts by mass or more and 100 parts by mass or less, with respect to 100 parts by mass of component (A).

(C) Aluminum Oxide Fine Particles Having an Average Particle Diameter of 1-100 nm The aluminum oxide fine particles having an average particle diameter of 1-100 nm as component (C) serve to prevent the aluminum oxide particles having an average particle diameter of 1-100 μm as component (B) from settling over time on the bottom of a coating material pan during coating, and to stabilize properties such as matting property of the hard coat to be formed.

Without wishing to be bound by theory, it can be considered that the reason why using the aluminum oxide fine particles having an average particle diameter of 1-100 nm as component (C) can prevent settlement of the aluminum oxide particles having an average particle diameter of 1-100 μm as component (B) is that component (C) adsorbs to the surface of component (B) to enhance the affinity with other components in the coating material or the solvation.

It is preferable to use the aluminum oxide fine particles having an average particle diameter of 1-100 nm as component (C) whose surface is treated with a surface treatment agent or the like, for example, silane based coupling agents such as vinylsilane and aminosilane; titanate based coupling agents; aluminate based coupling agents; organic compounds having an ethylenic unsaturated bond group such as (meth)acryloyl group, vinyl group or allyl group, or reactive functional group such as epoxy group; and fatty acids and fatty acid metal salts. Using the fine particles treated with such a surface treatment agent, it is possible to enhance dispersibility of component (C) in the coating material thereby further increasing the effect of preventing settlement of component (B).

From a viewpoint of preventing the hard coat from becoming so opaque as to deteriorate the designability, the average particle diameter of the aluminum oxide fine particles having an average particle diameter of 1-100 nm as component (C) may be usually 100 nm or less, preferably 60 nm or less, more preferably 30 nm or less. On the other hand, there is no particular reason for limiting the lower limit of the average particle diameter of component (C), but normally available fine particles may be 1 nm at least.

From a viewpoint of surely obtaining the effect of using component (C), the amount (in terms of solid content; hereinafter the same also applies) of the aluminum oxide fine particles having an average particle diameter of 1-100 nm as component (C) may be usually 0.1 part by mass or more, preferably 0.3 parts by mass or more, more preferably 0.6 parts by mass or more, most preferably 1 part by mass or more, with respect to 100 parts by mass of the acrylic curable resin as component (A). On the other hand, from a viewpoint of economic efficiency, the amount of component (C) may be usually 20 parts by mass or less, preferably 10 parts by mass or less, more preferably 5 parts by mass or less.

In one aspect, the amount of the aluminum oxide fine particles having an average particle diameter of 1-100 nm as component (C) may be usually 0.1 part by mass or more and 20 parts by mass or less, preferably 0.1 part by mass or more and 10 parts by mass or less, 0.1 part by mass or more and 5 parts by mass or less, 0.3 parts by mass or more and 20 parts by mass or less, 0.3 parts by mass or more and 10 parts by mass or less, 0.3 parts by mass or more and 5 parts by mass or less, 0.6 parts by mass or more and 20 parts by mass or less, 0.6 parts by mass or more and 10 parts by mass or less, 0.6 parts by mass or more and 5 parts by mass or less, 1 part by mass or more and 20 parts by mass or less, 1 part by mass or more and 10 parts by mass or less, or 1 part by mass or more and 5 parts by mass or less, with respect to 100 parts by mass of component (A).

(D) Compound Having Two or More Isocyanate Groups Per Molecule

The compound having two or more isocyanate groups (—N=C=O) per molecule as component (D) serves to improve crack resistance and bending resistance of the hard coat by reacting with the hydroxyl group of the acrylic curable resin as component (A) to form a urethane bond. It also serves to improve adhesion between the hard coat and the film substrate.

Examples of the compound having two or more isocyanate groups (—N=C=O) per molecule as component (D) may include urethane crosslinking agents such as hexamethylene diisocyanate, isophorone diisocyanate, tolylene diisocyanate, and methylene bis-4-cyclohexyl isocyanate; polyisocyanates such as a trimethylolpropane adduct of tolylene diisocyanate, a trimethylolpropane adduct of hexamethylene diisocyanate, a trimethylolpropane adduct of isophorone diisocyanate, an isocyanurate of tolylene diisocyanate, an isocyanurate of hexamethylene diisocyanate, an isocyanurate of isophorone diisocyanate and a biuret of hexamethylene diisocyanate; and blocked-type isocyanates of the above polyisocyanates.

From a viewpoint of good balance between scratch resistance of the hard coat and crack resistance and bending resistance thereof, the compound having two or more isocyanate groups (—N═C═O) per molecule as component (D) is preferably a compound having 3 isocyanate groups per molecule, more preferably a compound being a trimer of hexamethylene diisocyanate and having an isocyanate ring structure (represented by the following formula (1)), a compound being a trimer of hexamethylene diisocyanate and being a trimethylolpropane adduct (represented by the following formula (2)) and a compound being a trimer of hexamethylene diisocyanate and being a biuret (represented by the following formula (3): wherein R is —(CH$_2$)$_6$—).

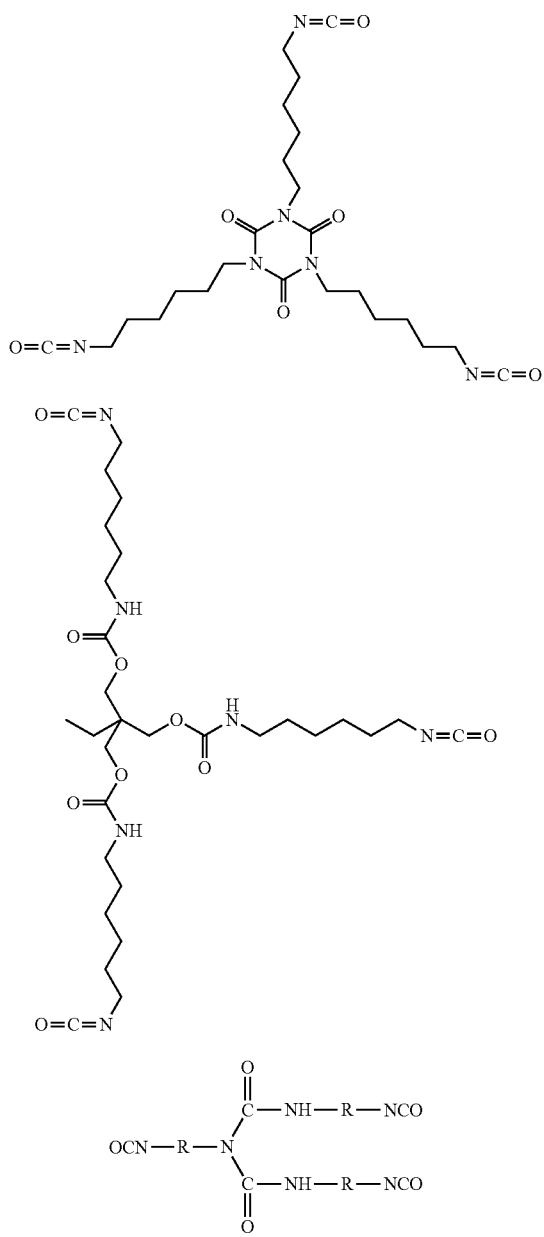

Without wishing to be bound by theory, it can be considered that because these compounds have a structural feature that isocyanate groups are present at end positions of the hexamethylene chains apart from each other, the obtained hard coat is excellent in crack resistance and bending resistance, and also excellent in scratch resistance. Accordingly, it can be believed that compounds having two or more isocyanate groups (—N═C═O) per molecule other than the above, which have a structural feature that isocyanate groups are present at end positions of the alkyl chains apart from each other can also be preferably used in the same manner.

From a viewpoint of crack resistance and bending resistance of the hard coat to be formed, the coating material according to at least one embodiment may have a ratio (a/b) of the number (a) of hydroxyl groups derived from the acrylic curable resin as the compound (A) to the number (b) of isocyanate groups derived from the compound having two or more isocyanate groups (—N═C═O) per molecule as component (D) of usually 0.5 or more, preferably 0.8 or more, more preferably 0.9 or more. On the other hand, from a viewpoint of water resistance of the hard coat and from a viewpoint of sufficient progress of the crosslinking reaction, the ratio may be usually 2 or less, preferably 1.8 or less, more preferably 1.6 or less, still more preferably 1.4 or less.

In one aspect, the ratio (a/b) may be usually 0.5 or more and 2 or less, preferably 0.5 or more and 1.8 or less, 0.5 or more and 1.6 or less, 0.5 or more and 1.4 or less, 0.8 or more and 2 or less, 0.8 or more and 1.8 or less, 0.8 or more and 1.6 or less, 0.8 or more and 1.4 or less, 0.9 or more and 2 or less, 0.9 or more and 1.8 or less, 0.9 or more and 1.6 or less, or 0.9 or more and 1.4 or less.

In the present specification, the number of the hydroxyl groups derived from the acrylic curable resin as component (A) per unit amount is determined by a method in accordance with JIS-K1557-1:2007 in which the hydroxyl groups in component (A) are acetylated with an acetylating reagent (a solution of acetic anhydride in pyridine), then the excess acetylating reagent is hydrolyzed with water, and produced acetic acid is titrated with a solution of potassium hydroxide in ethanol using an automatic potentiometric titrator "AT-610" (trade name) from Kyoto Electronics Manufacturing Co., Ltd. Any automatic potentiometric titrator available from another supply source may be used as long as the number of the hydroxyl groups derived from the acrylic curable resin (A) per unit amount can be determined by the method. In other words, those skilled in the art can determine the number of the hydroxyl groups derived from component (A) per unit amount based on the above standard and referring to the technical common sense.

In addition, a material in which the number of hydroxyl groups can be counted by the method despite the fact that it contains no hydroxyl group in structure is presumed to contain a component having a hydroxyl group as a by-product.

In the specification, the number of the isocyanate groups derived from the compound having two or more isocyanate groups (—N═C═O) per molecule as component (D) per unit amount is determined by a method in accordance with JIS-K7301:1995 in which the isocyanate groups in component (D) are reacted with di-n-butylamine, then the excess di-n-butylamine is titrated with an aqueous hydrochloric acid solution using an automatic potentiometric titrator "AT-610" (trade name) from Kyoto Electronics Manufacturing Co., Ltd. Any automatic potentiometric titrator available from another supply source may be used as long as the number of the isocyanate groups derived from the compound having two or more isocyanate groups (—N=C=O) per molecule (D) per unit amount can be determined by the method. In other words, those skilled in the art can determine the number of the isocyanate groups derived from component (D) per unit amount based on the above standard and referring to the technical common sense.

As the compound having two or more isocyanate groups (—N=C=O) per molecule as component (D), one kind or a mixture of two or more kinds of them may be used. Further, a catalyst such as dibutyltin dilaurate or dibutyltin diethylhexoate may be added, if desired, to the extent not contrary to the object of the various embodiments.

From a viewpoint of curability, the amount of the compound having two or more isocyanate groups (—N=C=O) per molecule as component (D) may be usually 100 parts by mass or less, preferably 80 parts by mass or less, more preferably 60 parts by mass or less, still preferably 50 parts by mass or less, with respect to 100 parts by mass of component (A). On the other hand, from a viewpoint of surely obtaining the effect of using component (D), the amount of component (D) may be usually 1 part by mass or more, preferably 10 parts by mass or more, more preferably 20 parts by mass or more, still preferably 25 parts by mass or more.

In one aspect, the amount of the compound having two or more isocyanate groups (—N=C=O) per molecule as component (D) may be usually 1 part by mass or more and 100 parts by mass or less, preferably 1 part by mass or more and 80 parts by mass or less, 1 part by mass or more and 60 parts by mass or less, 1 part by mass or more and 50 parts by mass or less, 10 parts by mass or more and 100 parts by mass or less, 10 parts by mass or more and 80 parts by mass or less, 10 parts by mass or more and 60 parts by mass or less, 10 parts by mass or more and 50 parts by mass or less, 20 parts by mass or more and 100 parts by mass or less, 20 parts by mass or more and 80 parts by mass or less, 20 parts by mass or more and 60 parts by mass or less, 20 parts by mass or more and 50 parts by mass or less, 25 parts by mass or more and 100 parts by mass or less, 25 parts by mass or more and 80 parts by mass or less, 25 parts by mass or more and 60 parts by mass or less, or 25 parts by mass or more and 50 parts by mass or less, with respect to 100 parts by mass of component (A).

In the coating material according to at least one embodiment, one kind or two or more kinds of optional components such as curable resins other than component (A), inorganic particles (including inorganic fine particles) other than component (B) and component (C), compounds having an isocyanate group other than component (D), thermoplastic resins, antistatic agents, surfactants, leveling agents, thixotropy imparting agents, antifouling agents (or stain-proofing agents), printing property-improving agents, antioxidants, weather-resistant stabilizers, light-resistant stabilizers, ultraviolet ray absorbers, heat stabilizers, organic particles (including organic fine particles) and coloring agents may be contained, if desired, to the extent not contrary to the object of the various embodiments.

In the coating material according to at least one embodiment, a solvent may be contained, if desired, in order to dilute the coating material to a concentration that facilitates coating. The solvent is not particularly limited as long as it does not react with components (A) to (D) or other optional components, or does not catalyze (facilitate) self-reaction (including deterioration reaction) of these components. Examples of the solvent may include 1-methoxy-2-propanol, ethyl acetate, n-butyl acetate, toluene, methyl ethyl ketone, methyl isobutyl ketone, diacetone alcohol and acetone. As the solvent, one kind or a mixture of two or more kinds of them may be used.

The coating material according to at least one embodiment can be obtained by mixing and stirring these components.

A method for forming the hard coat using the coating material according to at least one embodiment is not particularly limited, but a known web coating method may be used. Examples of such a method may include roll coating, gravure coating, reverse coating, roll brushing, spray coating, air knife coating and die coating.

2. Decorative Sheet

The decorative sheet according to at least one embodiment is a decorative sheet having a hard coat formed using the coating material according to at least one embodiment. The decorative sheet can be usually produced and distributed as a roll wound in a rolled shape, and it can be then cut as desired for use in decoration of the surface of an article. The hard coat formed using the coating material according to at least one embodiment can be usually formed as a surface protective layer on the front side surface (the surface normally viewed in an actual use state) of the decorative sheet according to at least one embodiment. Here, the actual use state means a state in which the decorative sheet is used for decoration of the surface of various articles.

Examples of the decorative sheet according to at least one embodiment may include a decorative sheet having a printed layer on the front side surface of a thermoplastic resin film and further having a hard coat formed using the coating material according to at least one embodiment on the surface of the printed layer.

The thermoplastic resin film is a layer to be a substrate of the decorative sheet. From a viewpoint of designability, the thermoplastic resin film is usually colored to serve to conceal an adherend.

Examples of the thermoplastic resin film may include resin films of polyvinyl chloride based resins; polyester based resins such as aromatic polyester and aliphatic polyester; polyolefin based resins such as polyethylene, polypropylene and polymethyl pentene; acrylic resins; polycarbonate based resins; poly (meth)acrylimide based resins; styrene based resins such as polystyrene, acrylonitrile-butadiene-styrene copolymer resin (ABS resin), styrene-ethylene-butadiene-styrene copolymer, styrene-ethylene-propylene-styrene copolymer and styrene-ethylene-ethylene-propylene-styrene copolymer; cellulose based resins such as cellophane, triacetyl cellulose, diacetyl cellulose and acetyl cellulose butyrate; polyvinylidene chloride based resins; fluorine-containing resins such as polyvinylidene fluoride; as well as polyvinyl alcohol, ethylene vinyl alcohol, polyether ether ketone, nylon, polyamide, polyimide, polyurethane, polyether imide, polysulfone and polyether sulfone. These films include unstretched films, uniaxially stretched films and biaxially stretched films. Also included is a laminated film obtained by stacking two or more layers of one or more kinds of these films.

The coloring agent for coloring the thermoplastic resin film is not particularly limited, but any coloring agent may be used. Examples of the coloring agent may include titanium oxide and carbon black. As the coloring agent, one kind or a mixture of two or more kinds of them may be used. The amount of the coloring agent is usually about 0.1-40 parts by mass, with respect to 100 parts by mass of the base resin used for the thermoplastic resin film, although it depends on the type of the coloring agent and the desired concealing property.

The thickness of the thermoplastic resin film is not particularly limited, but may be preferably 50 μm or more, more preferably 75 μm or more, from a viewpoint of handleability during production of the decorative sheet. On the other hand, the thickness of the thermoplastic resin film may be usually 300 μm or less, preferably 200 μm or less, from a viewpoint of workability during application of the decorative sheet to an article.

In one aspect, the thickness of the thermoplastic resin film may be preferably 50 μm or more and 300 μm or less, 50 μm or more and 200 μm or less, 75 μm or more and 300 μm or less, or 75 μm or more and 200 μm or less.

The printed layer is provided for imparting high designability. The printed layer can be formed by printing any pattern with any ink using any printing machine.

The printed layer can be applied onto the front side surface of the thermoplastic resin film on the whole or in part either directly or via an anchor coat. The pattern may include a metallic pattern such as hair lines, wood grain pattern, stone mesh pattern imitating the surface of rock such as marble, cloth pattern imitating texture or cloth-like pattern, tile pattern, brickwork pattern, wooden mosaic pattern, and patchwork. As a printing ink, a pigment, solvent, stabilizer, plasticizer, catalyst, curing agent and the like appropriately mixed with a binder may be used. As the binder, for example, resins such as a polyurethane based resin, vinyl chloride-vinyl acetate based copolymer resin, vinyl chloride-vinyl acetate-acrylic copolymer resin, chlorinated polypropylene based resin, acrylic resin, polyester based resin, polyamide based resin, butyral based resin, polystyrene based resin, nitrocellulose based resin and cellulose acetate based resin, and resin compositions of them may be used. In addition, in order to provide a metal-like design, aluminum, tin, titanium, indium, oxides of them and the like may be deposited on the front side surface of the thermoplastic resin film on the whole or in part either directly or via an anchor coat using a known method.

A method for forming a hard coat on the surface of the printed layer formed on the front side surface of the thermoplastic resin film either directly or via an anchor coat using the coating material according to at least one embodiment is not particularly limited, but a known web coating method may be used. Examples of the above method may include roll coating, gravure coating, reverse coating, roll brushing, spray coating, air knife coating and die coating.

The thickness of the matte hard coat formed using the coating material according to at least one embodiment is not particularly limited, but may be usually 1 μm or more, preferably 5 μm or more, more preferably 10 μm or more, from a viewpoint of surface hardness. In addition, from a viewpoint of secondary processability and web handling property of the decorative sheet according to at least one embodiment, the thickness of the matte hard coat may be preferably 100 μm or less, more preferably 50 μm or less.

In one aspect, the thickness of the matte hard coat may be preferably 1 μm or more and 100 μm or less, 1 μm or more and 50 μm or less, 5 μm or more and 100 μm or less, 5 μm or more and 50 μm or less, 10 μm or more and 100 μm or less, or 10 μm or more and 50 μm or less.

An anchor coating agent for forming the anchor coat is not particularly limited, but any anchor coating agent may be used. Examples of the anchor coating agent may include polyester based anchor coating agents, acrylic based anchor coating agents, polyurethane based anchor coating agents, acrylic urethane based anchor coating agents, and polyester urethane based anchor coating agents. As the anchor coating agent, one kind or more of them may be used.

In the anchor coating agent, one kind or two or more kinds of additives such as antioxidants, weather-resistant stabilizers, light-resistant stabilizers, ultraviolet ray absorbers, heat stabilizers, antistatic agents, surfactants, coloring agents, infrared ray shielding agents, leveling agents, thixotropy imparting agents and fillers may be contained, if desired, to the extent not contrary to the object of the various embodiments.

A method for forming the anchor coat using the anchor coat agent is not particularly limited, but a known web coating method may be used. Examples of the above method may include roll coating, gravure coating, reverse coating, roll brushing, spray coating, air knife coating and die coating.

The thickness of the anchor coat is not particularly limited, but may be usually about 0.01-5 μm, preferably 0.1-2 μm.

From a viewpoint of improving adhesion with an adherend to be decorated using the decorative sheet according to at least one embodiment, the decorative sheet according to at least one embodiment may have a pressure-sensitive adhesive layer or adhesive layer formed on the surface opposite to the front side surface of the thermoplastic resin film either directly or via an anchor coat.

FIG. 1 is a conceptual cross-sectional diagram showing an example of the decorative sheet according to at least one embodiment (with a pressure-sensitive adhesive layer). A hard coat 1 formed from the coating material according to at least one embodiment, a printed layer 2, a layer 3 of the colored thermoplastic resin film, and a pressure-sensitive adhesive layer 4 are provided in this order from the surface.

EXAMPLE

Hereinafter, a description is made of the various embodiments with reference to Examples, but the various embodiments are not limited thereto.

Measuring Methods (i) 60 Degree Gloss Value (Matting Property)

In accordance with JIS Z8741:1997, 60 degree gloss value of the hard coat surface was measured using a multi angle gloss meter "GM-268" (trade name) from Konica Minolta, Inc.

(ii) Taber Abrasion (Scratch Resistance 1)

In accordance with JIS K7204:1999, the hard coat surface of a sample taken from a decorative sheet was abraded using a Taber abrasion tester from Tester Sangyo Co., Ltd. with a rotation speed of 72 rpm and a load of 1 Kg under a condition where an abrasion wheel CS17 was cleaned every 1000 rotations. Upon cleaning of the abrasive wheel, the hard coat surface of the sample was visually observed to determine whether or not abrasion reached the printed layer, and determine the maximum rotation speed at which abrasion did not reach the printed layer. For example, when the value in the table was 5000 times, it means that abrasion did not reach the printed layer at a number of rotations of 5000 times, but reached the printed layer at a number of rotations of 6000 times.

(iii) Steel Wool Resistance (Scratch Resistance 2)

A test piece of a decorative sheet was placed on a Gakushin tester for JIS L0849:2013 (friction tester type 1) such that a hard coat of the decorative sheet was on the surface and the reciprocating direction of the friction terminal of the Gakushin tester and the machine direction of the decorative sheet were parallel to each other, and #0000 steel wool was attached to the friction terminal. Then, the #0000 steel wool was rubbed back and forth 10 times against the surface of the test piece under conditions of a load of 500 g, a moving distance of 60 mm, and a speed of 1 round trip/s. The friction part was visually observed for determination in accordance with the following criteria.

⊚ (Very good): no scratch is recognized.
○ (Good): there are 1-3 scratches.
Δ (Slightly poor): there are 4-10 scratches.
x (Poor): there are 11 or more scratches.

(iv) Mandrel Test (Index of Crack Resistance and Bending Resistance)

In accordance with JIS K5600-5-1:1999, a flex resistance test by a cylindrical mandrel method was carried out using a sample taken from a decorative sheet in sizes of 100 mm in the machine direction and 50 mm in the lateral direction of the decorative sheet. Among mandrels by which cracking was not generated, the diameter of a mandrel which had the smallest diameter was determined.

(v) Formability 1

Figure 3:
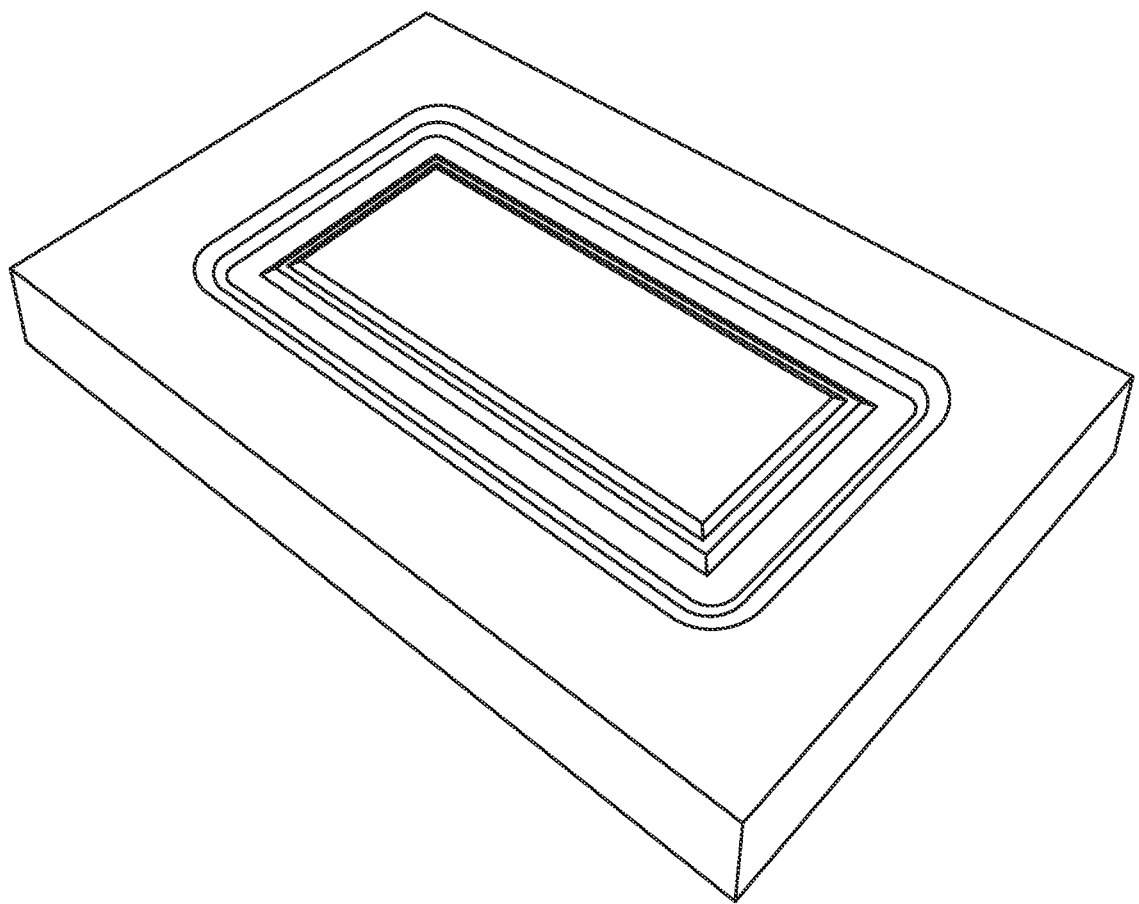
FIG. 3 is a photograph of an adherend used in Examples.

(v-1) "MDF processed article" (trade name) that was a medium density fiber board (abbreviated as "MDF") with smooth surface, available from Tokunaga N.C. Limited Company, was cut to 300 mm in length, 200 mm in width and 18 mm in thickness, subjected to a curved surface processing (3 to 10 R), and further provided with decorative grooves engraved on the top surface, to prepare an adherend. A photograph of the obtained adherend is shown in FIG. 3.

(v-2) Adhesive "630.2" (trade name) available from Kleiberit Klebstoffe GmbH was sprayed on the entire surface of the obtained adherend.

(v-3) A base (made of MDF with smooth surface having a length of 290 mm, a width of 180 mm and a thickness of 18 mm) was placed at a predetermined position of a membrane forming machine "PRESSEN KT-M-139/280-24" (trade name) available from Wemhoner Surface Technologies GmbH and the adherend was placed on the base such that the surface opposite to the top surface of the adherend was on the base side, the longitudinal direction of the base matched the longitudinal direction of the adherend, and the intersection point on the diagonal lines of the longitudinal and lateral surface of the base matched the intersection point on the diagonal lines of the longitudinal and lateral surface of the adherend. Furthermore, on the adherend, a cut decorative sheet (in sizes of 450 mm in the machine direction and 350 mm in the lateral direction) was placed such that the surface opposite to the matte hard coat surface of the cut decorative sheet served as the sticking surface, the longitudinal direction of the adherend matched the machine direction of the decorative sheet, and the intersection point on the diagonal lines of the longitudinal and lateral surface of the adherend matched the intersection point on the diagonal lines of the longitudinal and lateral surface of the cut decorative sheet.

(v-4) After preheating a membrane of the membrane forming machine such that the surface temperature was 80° C., membrane formation was carried out under conditions of a temperature of 110° C., a pressing time of 60 seconds and a pressure of 0.39 MPa, to prepare a shaped body.

(v-5) The appearance of the obtained shaped body was visually observed with naked eyes (with a orrected visual acuity of 1.0) or through a loupe (at a magnification of 25 times) to evaluate according to the following criteria.

A: The decorative sheet uniformly follows the three-dimensional shape of the adherend, and the color pattern uniformly stretches.

B: The decorative sheet stretches following the three-dimensional shape of the adherend. However, in the greatly stretched portion, the matte hard coat has fine cracks which are not recognized with the naked eyes but are recognized through the loupe.

C: The decorative sheet stretches following the three-dimensional shape of the adherend. However, in the greatly stretched portion, the matte hard coat has cracks which are recognized with the naked eyes.

D: There is a part where the decorative sheet cannot follow the three-dimensional shape of the adherend.

(vi) Formability 2

The same procedure as in Formability 1 described above was carried out, except that no decorative grooves were formed on the top surface of the adherend.

Materials Used (A) Acrylic Curable Resins (A-1) A resin composed of a structural unit derived from 2-hydroxyethyl methacrylate: 19.8 mol %, a structural unit derived from styrene: 28.6 mol %, a structural unit derived from methyl methacrylate; 28.6 mol %, and a structural unit derived from butyl acrylate; 23.0 mol %. The resin has a wight average molecular weight of 23,000 and a number average molecular weight of 10,000; and a number of hydroxyl groups per unit amount of 1.75 mol/Kg.

(A-2) A resin composed of a structural unit derived from 2-hydroxyethyl methacrylate: 10.2 mol %, a structural unit derived from styrene: 28.3 mol %, a structural unit derived from methyl methacrylate; 33.8 mol %, and a structural unit derived from butyl acrylate; 27.7 mol %. The resin has a weight average molecular weight of 25,000 and a number average molecular weight of 11,000; and a number of hydroxyl groups per unit amount of 0.91 mol/Kg.

(A-3) A resin composed of a structural unit derived from 2-hydroxyethyl methacrylate: 20.4 mol %, a structural unit derived from styrene: 39.5 mol %, a structural unit derived from methyl methacrylate; 20.3 mol %, and a structural unit derived from butyl acrylate; 19.8 mol %. The resin has a weight average molecular weight of 24,000 and a number average molecular weight of 10,000; and a number of hydroxyl groups per unit amount of 1.80 mol/Kg.

(A-4) A resin composed of a structural unit derived from 2-hydroxyethyl methacrylate: 19.6 mol %, a structural unit derived from styrene: 29.2 mol %, a structural unit derived from methyl methacrylate; 22.1 mol %, and a structural unit derived from butyl acrylate; 29.1 mol %. The resin has a weight average molecular weight of 27,000 and a number average molecular weight of 13,000; and a number of hydroxyl groups per unit amount of 1.70 mol/Kg.

(A-5) A resin composed of a structural unit derived from 2-hydroxyethyl methacrylate: 27.2 mol %, a structural unit derived from styrene: 38.4 mol %, and a structural unit derived from methyl methacrylate; 34.4 mol %. The resin has a weight average molecular weight of 26,000 and a number average molecular weight of 12,000; and a number of hydroxyl groups per unit amount of 2.45 mol/Kg.

(A-6) A resin composed of a structural unit derived from 2-hydroxyethyl methacrylate: 11.8 mol %, a structural unit derived from styrene: 23.0 mol %, a structural unit derived from methyl methacrylate; 18.9 mol %, and a structural unit derived from butyl acrylate; 46.3 mol %. The resin has a weight average molecular weight of 25,000 and a number average molecular weight of 11,000; and a number of hydroxyl groups per unit amount of 1.00 mol/Kg.

(A-7) A resin composed of a structural unit derived from 2-hydroxypropyl methacrylate: 20.1 mol %, a structural unit derived from styrene: 29.5 mol %, a structural unit derived from methyl methacrylate; 27.1 mol %, and a structural unit derived from butyl acrylate; 23.3 mol %. The resin has a weight average molecular weight of 24,000 and a number average molecular weight of 11,000; and a number of hydroxyl groups per unit amount of 1.72 mol/Kg.

(A-8) A resin composed of a structural unit derived from 2-hydroxyethyl methacrylate: 20.0 mol %, a structural unit derived from styrene: 39.7 mol %, a structural unit derived from methyl methacrylate; 24.5 mol %, and a structural unit derived from 2-ethylhexyl acrylate; 15.8 mol %. The resin has a weight average molecular weight of 24,000 and a number average molecular weight of 10,000; and a number of hydroxyl groups per unit amount of 1.66 mol/Kg.

(A-9) A resin composed of a structural unit derived from styrene: 39.5 mol %, a structural unit derived from methyl methacrylate: 42.1 mol %, and a structural unit derived from butyl acrylate; 18.4 mol %. The resin has a weight average molecular weight of 24,000 and a number average molecular weight of 11,000; and a number of hydroxyl groups per unit amount of 0.00 mol/Kg.

(B) Aluminum Oxide Particles Having Average Particle Diameter of 1-100 μm (B-1) Spherical aluminum oxide particles "Alunabeads CB-P10" (trade name) available from Showa Denko K.K., with an average particle diameter of 10 μm.

(C) Aluminum Oxide Fine Particles Having Average Particle Diameter of 1-100 nm (C-1) A dispersion of aluminum oxide fine particles whose surface is treated with a silane coupling agent, with an average particle diameter of 20 nm and a solid content (content of aluminum oxide fine particles) of 37% by mass. Note that the amounts in terms of solid content for this component are shown in Tables below.

(D) A Compound Having Two or More Isocyanate Groups Per Molecule (D-1) A biuret form of hexamethylene diisocyanate, "No. 21 curing agent" (trade name) available from Natco Co., Ltd. (corresponding to a compound represented by the formula (3)). The compound has a number of isocyanate groups per unit amount: 3.24 mol/Kg.

(E) Other Component (E-1) Methyl ethyl ketone

Example 1

1. Preparation of Coating Material

A coating material was obtained by mixing and stirring 100 parts by mass of the component (A-1), 80 parts by mass of the component (B-1), 6 parts by mass of the component (C-1) (2.2 parts by mass in terms of solid content; the value in terms of solid content is shown in the table), 40 parts by mass of the component (D-1), and 150 parts by mass of the component (E-1). The ratio (a/b) of the number (a) of the hydroxyl groups derived from the component (A) to the number (b) of the isocyanate groups derived from the component (D) was calculated as 1.35 according to the kinds and ratios of the materials used.

2. Production of Decorative Sheet (2-1) On one surface of a white colored polybutylene terephthalate based resin film "HR (WHT)" (trade name) available from Riken Technos Corp. as a film substrate having a thickness of 250 μm, a wood grain patterned printed layer having a thickness of 1 μm was formed using an ink containing a vinyl chloride/vinyl acetate copolymer as a medium. Furthermore, with the use of a film mayer bar type coating apparatus, a predried coat was formed using the coating material as obtained above, such that the thickness after curing became 15 μm.

Figure 4:
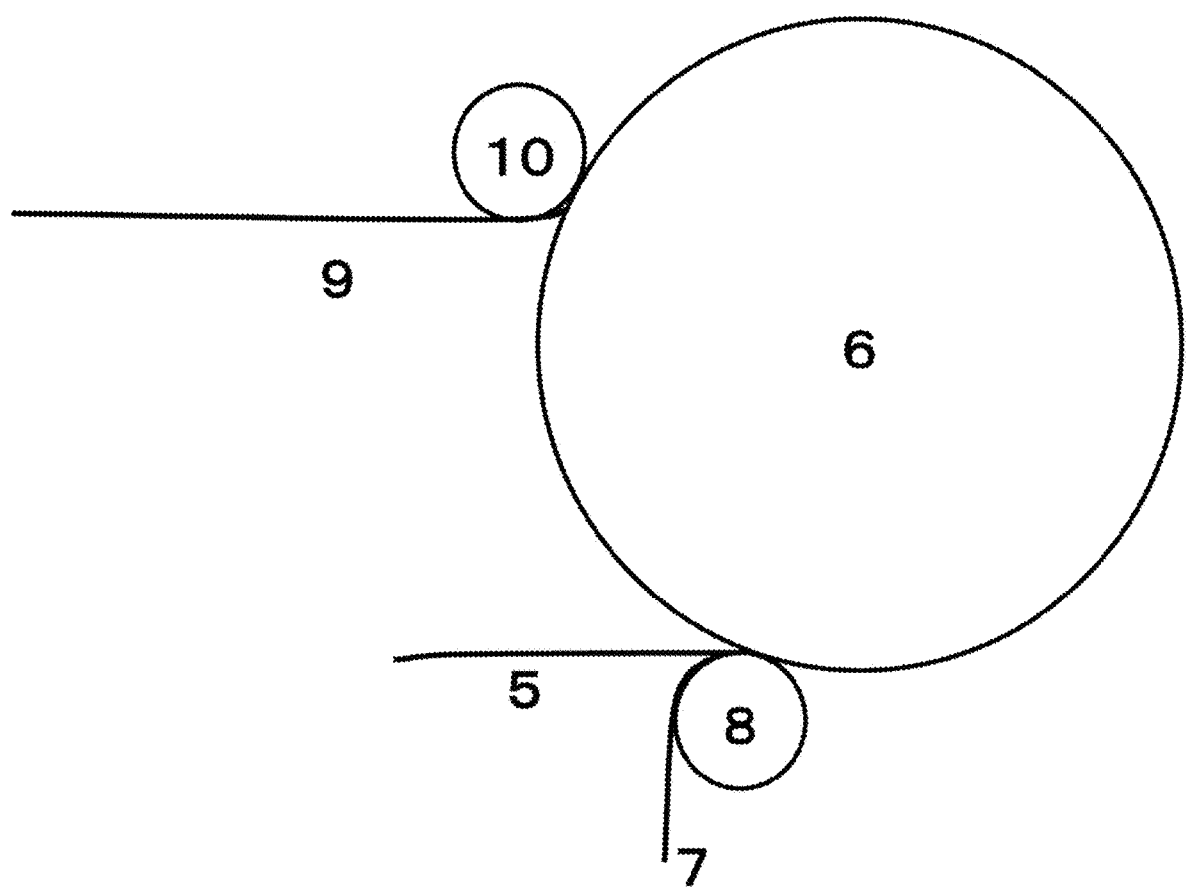
FIG. 4 is a conceptual diagram of a laminating apparatus used in Examples.

(2-2) Using an apparatus shown in the conceptual diagram in FIG. 4, a laminate 5 (i.e., a laminate having the film substrate, the printed layer and the predried coat in this order) obtained in the above paragraph (2-1) was then placed on a rotating heating drum 6 preheated to a temperature of 30° C. such that the surface of the laminate 5 on the side opposite to the predried coat was on the side of the heating drum 6, and further an emboss transferred film "SWPP" (trade name) 7 made of a polypropylene based resin available from Riken Technos Corp. was superimposed such that the embossed surface was on the side of the laminate 5, followed by bonding by a pressing roll 8 for temporary sticking. A laminate 9 of the laminate 5 and the emboss transferred film 7 (i.e., a laminate having the film substrate, the printed layer, the predried coat and the emboss transferred film in this order) was released from the heating drum 6 by a guide roll 10.

(2-3) The laminate 9 was then passed through a heating furnace at a temperature of 90° C. to harden the predried coat to form a hard coat. Aging was performed at a temperature of 40° C. for 3 days.

(2-4) Subsequently, the emboss transferred film was removed by peeling to provide a decorative sheet having the layer of the white colored polybutylene terephthalate based resin film, the printed layer, and the hard coat in this order.

3. Evaluation of Decorative Sheet

The tests (i) to (vi) were carried out. The results are shown in Table 1. In addition, with respect to the vicinity of the central portion in the lateral direction of the decorative sheet, the 60 degree gloss value was measured according to the method for the test (i) at 20 points every 100 m in the machine direction, and from the obtained 20 measured values, the standard deviation of the 60 degree gloss values was determined. Because the standard deviation was 1.7, it can be evaluated that the matting property was stable. Similarly, with respect to the vicinity of the central portion in the lateral direction of the decorative sheet, the mandrel test was performed according to the method for the above item (iv) at 20 points every 100 m in the machine direction, and from the obtained 20 measured values, the standard deviation for the mandrel test was calculated. Because the standard deviation was 0.92, it can be evaluated that this property was also stable.

Examples 2 to 16

Decorative sheets were obtained in the same manner as in Example 1, except that the formulation of the coating material was changed as shown in Tables 1 and 2. The tests (i) to (vi) were carried out. The results are shown in Table 1 or 2. As to Examples 8 and 9, the standard deviation for the mandrel test was also measured. The standard deviation was 1.30 for Example 8, and 4.73 for Example 9.

TABLE 1

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Formulations of coating materials (parts by mass) | A-1 | 100 | — | — | — | 100 | 100 | 100 | 100 |
|  | A-2 | — | 100 | — | — | — | — | — | — |
|  | A-3 | — | — | 100 | — | — | — | — | — |
|  | A-4 | — | — | — | 100 | — | — | — | — |

TABLE 1-continued

|  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|
|  | A-5 | — | — | — | — | — | — | — | — |
|  | A-6 | — | — | — | — | — | — | — | — |
|  | A-7 | — | — | — | — | — | — | — | — |
|  | A-8 | — | — | — | — | — | — | — | — |
|  | A-9 | — | — | — | — | — | — | — | — |
|  | B-1 | 80 | 80 | 80 | 80 | 240 | 60 | — | 80 |
|  | C-1 | 2.2 | 2.2 | 2.2 | 2.2 | 2.2 | 2.2 | 2.2 | 0.52 |
|  | D-1 | 40 | 21 | 41 | 39 | 40 | 40 | 40 | 40 |
|  | E-1 | 150 | 150 | 150 | 150 | 250 | 130 | 100 | 150 |
|  | Ratio a/b | 1.35 | 1.34 | 1.36 | 1.35 | 1.35 | 1.35 | 1.35 | 1.35 |
| Evaluation results | 60 Degree gloss value | 22 | 24 | 22 | 26 | 20 | 22 | 25 | 22 |
|  | Scratch resistance 1 | 10000 | 8000 | 7000 | 9000 | 11000 | 8000 | 1000 | 8000 |
|  | Scratch resistance 2 | ◎ | ○ | ◎ | ○ | ◎ | ○ | X | ○ |
|  | Mandrel test mm | 8 | 10 | 16 | 8 | 20 | 8 | 5 | 10 |
|  | Formability 1 | A | A | B | A | C | A | A | A |
|  | Formability 2 | A | A | B | A | B | A | A | A |

TABLE 2

|  |  | Ex. 9 | Ex. 10 | Ex. 11 | Ex. 12 | Ex. 13 | Ex. 14 | Ex. 15 | Ex. 16 |
|---|---|---|---|---|---|---|---|---|---|
| Formulations (parts by mass) | A-1 | 100 | 100 | 100 | — | — | — | — | — |
|  | A-2 | — | — | — | — | — | — | — | — |
|  | A-3 | — | — | — | — | — | — | — | — |
|  | A-4 | — | — | — | — | — | — | — | — |
|  | A-5 | — | — | — | 100 | — | — | — | — |
|  | A-6 | — | — | — | — | 100 | — | — | — |
|  | A-7 | — | — | — | — | — | 100 | — | — |
|  | A-8 | — | — | — | — | — | — | 100 | — |
|  | A-9 | — | — | — | — | — | — | — | 100 |
|  | B-1 | 80 | 80 | 80 | 80 | 80 | 80 | 80 | 80 |
|  | C-1 | — | 2.2 | 2.2 | 2.2 | 2.2 | 2.2 | 2.2 | 2.2 |
|  | D-1 | 40 | 75 | 30 | 56 | 23 | 39 | 38 | 20 |
|  | E-1 | 150 | 170 | 150 | 150 | 150 | 150 | 150 | 150 |
|  | Ratio a/b | 1.35 | 0.72 | 1.80 | 1.35 | 1.34 | 1.36 | 1.35 | 0.00 |
| Evaluation results | 60 Degree gloss value | 22 | 23 | 23 | 26 | 22 | 23 | 25 | 27 |
|  | Scratch resistance 1 | 4000 | 7000 | 7000 | 12000 | 2000 | 10000 | 5000 | 1000 |
|  | Scratch resistance 2 | Δ | ◎ | ○ | ◎ | Δ | ◎ | ○ | X |
|  | Mandrel test mm | 16 | 25 | 8 | 32 | 2 | 8 | 12 | >32 |
|  | Formability 1 | B | D | A | D | A | A | B | D |
|  | Formability 2 | A | B | A | C | A | A | A | D |

It was found that each of the decorative sheets having the hard coat formed from the coating material according to at least one embodiment had a satisfactory matte design. Furthermore, each of the decorative sheets having the hard coat formed from the coating material according to at least one embodiment was also excellent in scratch resistance.

In addition, it was found that each of the decorative sheets having the hard coat formed from the coating material according to at least one embodiment could be suitably used for decoration of an adherend having a complicated curved surface.

REFERENCE SIGNS LIST

1 Hard coat
2 Printed layer
3 Layer of colored thermoplastic resin film
4 Pressure-sensitive adhesive layer
5 Laminate having film substrate, printed layer and pre-dried coat in this order
6 Heating drum
7 Emboss transferred film
8 Pressing roll
9 Laminate having film substrate, printed layer, predried coat and emboss transferred film in this order
10 Guide roll

The invention claimed is:

1. A coating material consisting of:
(A) 100 parts by mass of an acrylic curable resin;
(B) 5-250 parts by mass of aluminum oxide particles having an average particle diameter of 1-100 μm, the aluminum oxide particles being not treated by a surface treatment agent;
(C) 0.1-10 parts by mass of aluminum oxide fine particles having an average particle diameter of 1-100 nm, the aluminum oxide fine particles being treated by a surface treatment agent;
(D) 1-100 parts by mass of a compound having two or more isocyanate groups per molecule; and
optionally, at least one member selected from the group consisting of inorganic particles other than component (B) and component (C), compounds having an isocyanate group other than component (D), antistatic agents, surfactants, antifouling agents or stain-proofing agents, printing property-improving agents, antioxidants, weather-resistant stabilizers, light-resistant stabilizers, ultraviolet ray absorbers, heat stabilizers, organic particles, coloring agents and solvents,
wherein the acrylic curable resin (A) comprises: (a1) a structural unit derived from a hydroxyl group-containing (meth)acrylic acid ester; (a2) a structural unit derived from a vinyl aromatic compound; and (a3) a structural unit derived from a (meth)acrylic acid alkyl ester.

2. The coating material according to claim 1, wherein the acrylic curable resin (A) comprises the structural unit derived from a hydroxyl group-containing (meth)acrylic acid ester (a1) in an amount of 5 to 40 mol %, with respect to 100 mol % of the total sum of structural units derived from all constituent monomers.

3. The coating material according to claim 1, wherein the acrylic curable resin (A) comprises the structural unit derived from a vinyl aromatic compound (a2) in an amount of 10 to 50 mol %, with respect to 100 mol % of the total sum of structural units derived from all constituent monomers.

4. The coating material according to claim 1, wherein the acrylic curable resin (A) comprises the structural unit derived from a (meth)acrylic acid alkyl ester (a3) in an amount of 20 to 85 mol %, with respect to 100 mol % of the total sum of structural units derived from all constituent monomers.

5. The coating material according to claim 1, wherein the acrylic curable resin (A) comprises:
(a1) the structural unit derived from a hydroxyl group-containing (meth)acrylic acid ester;
(a2) the structural unit derived from a vinyl aromatic compound;
(a3-1) a structural unit derived from methyl methacrylate; and
(a3-2) a structural unit derived from an aliphatic alkyl ester having 4 or more carbon atoms of a (meth)acrylic acid.

6. The coating material according to claim 5, wherein the acrylic curable resin (A) comprises the structural unit derived from methyl methacrylate (a3-1) in an amount of 10 to 50 mol %, with respect to 100 mol % of the total sum of structural units derived from all constituent monomers.

7. The coating material according to claim 5, wherein the acrylic curable resin (A) comprises the structural unit derived from the aliphatic alkyl ester having 4 or more carbon atoms of a (meth)acrylic acid (a3-2) in an amount of 5 to 40 mol %, with respect to 100 mol % of the total sum of structural units derived from all constituent monomers.

8. An article comprising a hard coat formed from the coating material according to claim 1.

9. A decorative sheet comprising a hard coat formed from the coating material according to claim 1.

10. An article comprising the decorative sheet according to claim 9.

* * * * *